US008005852B2

United States Patent
Wang

(10) Patent No.: US 8,005,852 B2
(45) Date of Patent: Aug. 23, 2011

(54) COMMUNICATION DEVICE AND AN INFORMATION SEARCHING METHOD

(75) Inventor: Shao-Yuan Wang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 512 days.

(21) Appl. No.: 12/188,203

(22) Filed: Aug. 8, 2008

(65) Prior Publication Data

US 2009/0106199 A1 Apr. 23, 2009

(30) Foreign Application Priority Data

Oct. 23, 2007 (CN) .......................... 2007 1 0202223

(51) Int. Cl.
*G06F 7/00* (2006.01)
*G06F 17/30* (2006.01)
*G06F 12/00* (2006.01)
(52) U.S. Cl. .......................... 707/758; 707/609; 707/667
(58) Field of Classification Search .................. 707/640; 709/225, 217; 705/4
See application file for complete search history.

(56) References Cited

U.S. PATENT DOCUMENTS

| 5,806,057 A * | 9/1998 | Gormley et al. ............. 707/640 |
| 6,971,120 B1 | 11/2005 | Sheekookian |
| 2003/0135582 A1 * | 7/2003 | Allen et al. .................. 709/217 |
| 2005/0209892 A1 * | 9/2005 | Miller .............................. 705/4 |
| 2006/0179138 A1 * | 8/2006 | Van Gassel et al. .......... 709/225 |

* cited by examiner

*Primary Examiner* — Susan Chen
(74) *Attorney, Agent, or Firm* — Frank R. Niranjan

(57) ABSTRACT

A communication device may be used to obtain information regarding a group including a user and one or more group members. The communication device includes a table creating module, a user interface, a salutation obtaining module, and an information searching module. The table creating module is configured for creating a data table according to the one or more group members and relationships among the one or more group members of the group. The data table includes at least two personal nodes and a group node. The user interface is configured for acquiring login information about the user. The salutation obtaining module is configured for obtaining a salutation that is used by the user for obtaining a group member's information in the group. The information searching module is configured for locating a personal node corresponding to the group member in the data table according to the login information and the salutation.

14 Claims, 6 Drawing Sheets

COMMUNICATION DEVICE AND AN INFORMATION SEARCHING METHOD

BACKGROUND

1. Field of the Invention

Embodiments of the present disclosure relate to network communications, and more particularly, to a communication device employing an information searching method.

2. Description of Related Art

With recent developments in digital home networking technologies, more home devices, such as digital telephones and set-top boxes, are able to give a person a call or an email. A user of a home device needs to manually search the person's information and input it into the home device. This searching and inputting may be inconvenient and be easy to make mistakes.

Therefore, a heretofore unaddressed need exists in home devices to overcome the aforementioned deficiencies and inadequacies.

SUMMARY

A communication device for obtaining information regarding a group including a user and one or more group members includes a table creating module, a user interface, a salutation obtaining module, and an information searching module. The table creating module is configured for creating a data table according to relationships between the user and the one or more group members in the group. The data table includes at least two personal nodes and a group node. Each personal node of the at least two personal nodes corresponds to a group member of the group. The group node is connected to the at least two personal nodes. The user interface is configured for acquiring a login information about the user. The salutation obtaining module is configured for obtaining a salutation of the one or more group members according to the user. The information searching module is configured for searching the data table according to the login information and the salutation of a group member in the group so as to determine a personal node corresponding to the group member, and configured for acquiring information about the group member according to the personal node corresponding to the group member.

Other advantages and novel features of the present invention will be drawn from the following detailed description, in which:

DETAILED DESCRIPTION OF CERTAIN INVENTIVE EMBODIMENTS

Figure 1:
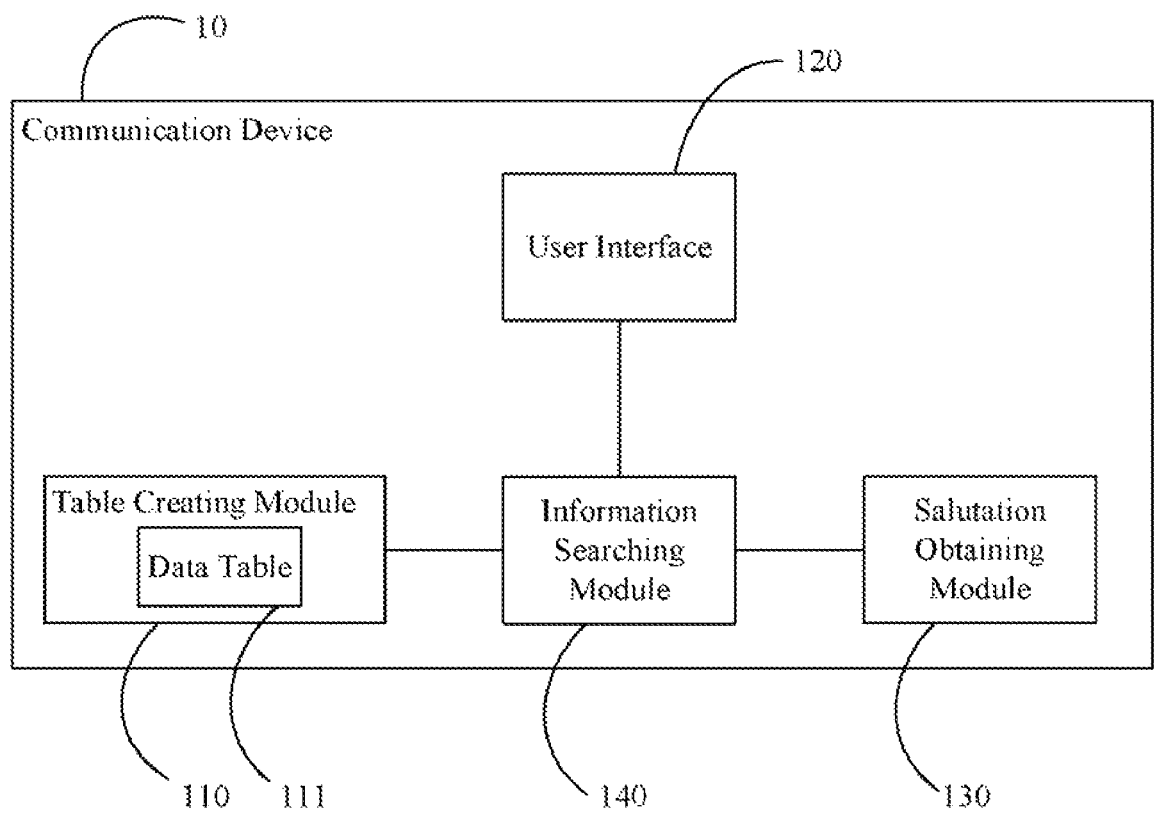
FIG. 1 is a block diagram of functional modules of one embodiment of a communication device including functional modules according to the present disclosure.

FIG. 1 is a block diagram of functional modules of one embodiment of a communication device 10 including functional modules according to the present disclosure. The communication device 10 is configured for obtaining information regarding a group including a user and one or more group members via a salutation. The salutation is used by the user to obtain specific information about the one or more group members. For example, if the user wants to email his or her father, then the specific group member is the user's father and the salutation may be "father." Therefore, the communication device 10 can automatically obtain an email address of the user's father's via the salutation "father."

Information regarding each group member in the group includes at least a personal identifier of the group member and other relevant personal information associated with the personal identifier. Each group member has a unique personal identifier, such as a name, a nickname, or an index, which differentiates the group member from other group members in the group. The relevant personal information may include telephone numbers, email addresses, for example.

The communication device 10 includes a table creating module 110, a user interface 120, a salutation obtaining module 130, and an information searching module 140.

The table creating module 110 is used for creating a data table 111 according relationships between the user and the one or more group members. In one particular embodiment, the group may be a family.

In one embodiment, the data table 111 includes at least two personal nodes. Each personal node corresponds to a group member in a group and may be used for storing information regarding the group member. The stored information, in one embodiment, may include a personal identifier, a gender, a seniority in the group, an order of siblings, among other relationships.

In one embodiment, the data table 111 further includes a group node. The group node is connected to personal nodes of various group members within the group. For example, a group node may be connected to personal nodes representing a father, a mother, and an eldest child of a family.

In one embodiment, each personal node in a group includes an identifier attribute and a seniority attribute. It may be understood that the identifier attribute is a personal identifier of a group member corresponding to each of the personal nodes. The seniority attribute indicates a seniority of a group member in a group corresponding to a personal node in the group.

In one embodiment, the identifier attribute is configured for locating a personal node through a personal identifier of a group member corresponding to the personal node. For example, if an identifier attribute of a personal node is configured as a group member's name "Mike," then the personal node can be located through the group member's name "Mike."

In one embodiment, a seniority attribute is configured for connecting a personal node to a group node. A seniority attribute may include "parent" or "child." For example, if a group member in a family is a parent, then a seniority attribute of the group member's personal node is "parent" and the seniority attribute connects the group member's personal node to a group node of the family. If a group member in a family is a child, then the seniority attribute of the group member's personal node is "child" and the seniority attribute connects the group member's personal node to a group node of the family.

In one embodiment, each group node in a group includes a plurality of status attributes. The status attribute is configured for connecting a personal node to a group node. The status attributes include "father," "mother," and "eldest." For example, if a member is a father in a family, then the member's personal node is connected to a group node corresponding to the family through the status attribute that is "father" of the group node. If a member is an eldest child in a family, then the member's personal node is connected to a group node corresponding to the family through the status attribute that is "eldest" of the group node.

In another embodiment, a group may be a family with children. In this embodiment, each personal node corresponding to one of the children of the family may further include a children attribute and a gender attribute. It may be understood that the children attribute of a personal node indicates relationships between siblings of the group regarding a group member corresponding to the personal node. The gender attribute of a personal node indicates a gender of a group member corresponding to the personal node.

In this embodiment, a children attribute of a personal node is configured for connecting a neighboring sibling's personal node in the family. For example, if a member A is a neighboring sibling of a member B in a family, then a children attribute of the member A's personal node connects the member A' personal node to the member B's personal node. In one embodiment, a children attribute may include "older" or "younger." For example, if the member A is an elder sibling of the member B in a family, then a children attribute "younger" of the member A's personal node connects the member B's personal node. That is, the member B's personal node can be searched via the children attribute "younger" of the member A's personal node. Meanwhile, a children attribute "older" of the member B's personal node connects the member A's personal node. That is, the member A's personal node can be searched via the children attribute "older" of the member B's personal node.

The gender attribute of a personal node indicates a gender of a group member corresponding to the personal node. In one embodiment, the gender attribute may include "male" or "female." The gender attribute is configured for distinguishing a sibling of a family is a sister or a brother. For example, if a member A is a elder brother of a member B, the member B is a younger sister of the member B, then the gender attribute of the member A's personal node is configured as "male" and the gender attribute of the member B's personal node is configured as "female."

Figure 2:
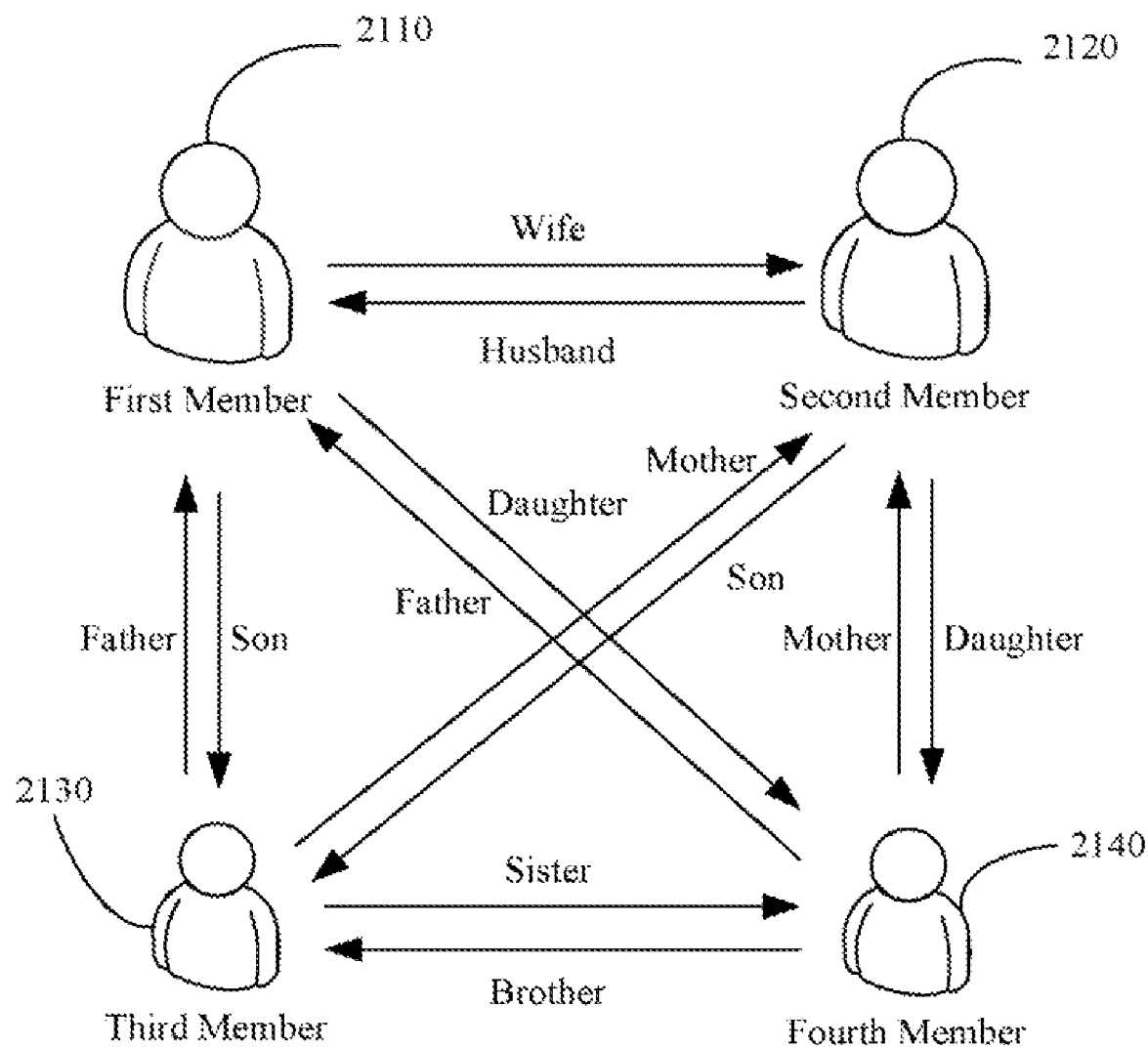
FIG. 2 is a schematic diagram of one embodiment of group members and the relationships among the group members according to the present disclosure.

FIG. 2 is a schematic diagram of one embodiment of group members and relationships among the group members according to the present disclosure. In the embodiment of FIG. 2, the group includes a family with a first member 2110, a second member 2120, a third member 2130, and a fourth member 2140. It may be understood that the first member 2110 and the second member 2120 are parents of the family. The third member 2130 and the fourth member 2140 are children of the family.

Figure 3:
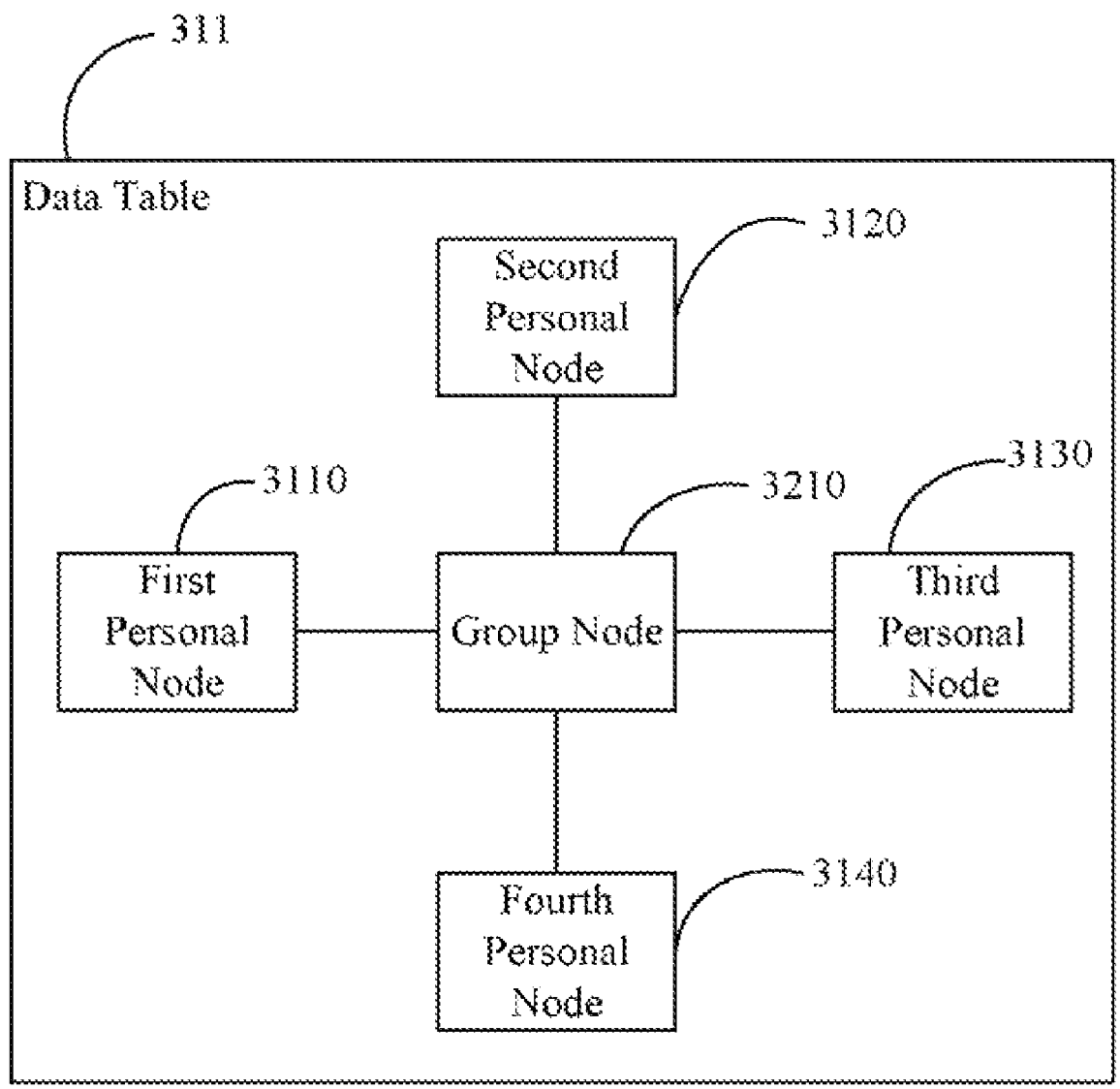
FIG. 3 is a schematic diagram of one embodiment of a data table of the present disclosure.

FIG. 3 is a schematic diagram of one embodiment of a data table 311 of the present disclosure. The data table 311 is one particular embodiment of the data table 111 of FIG. 1. In the embodiment of FIG. 3, there are a group and four group members in the group. Therefore, the data table 311 includes a first personal node 3110, a second personal node 3120, a third personal node 3130, a fourth personal node 3140, and a group node 3210. The group node 3210 is connected to the first personal node 3110, the second personal node 3120, the third personal node 3130, and the fourth personal node 3140.

Figure 4:
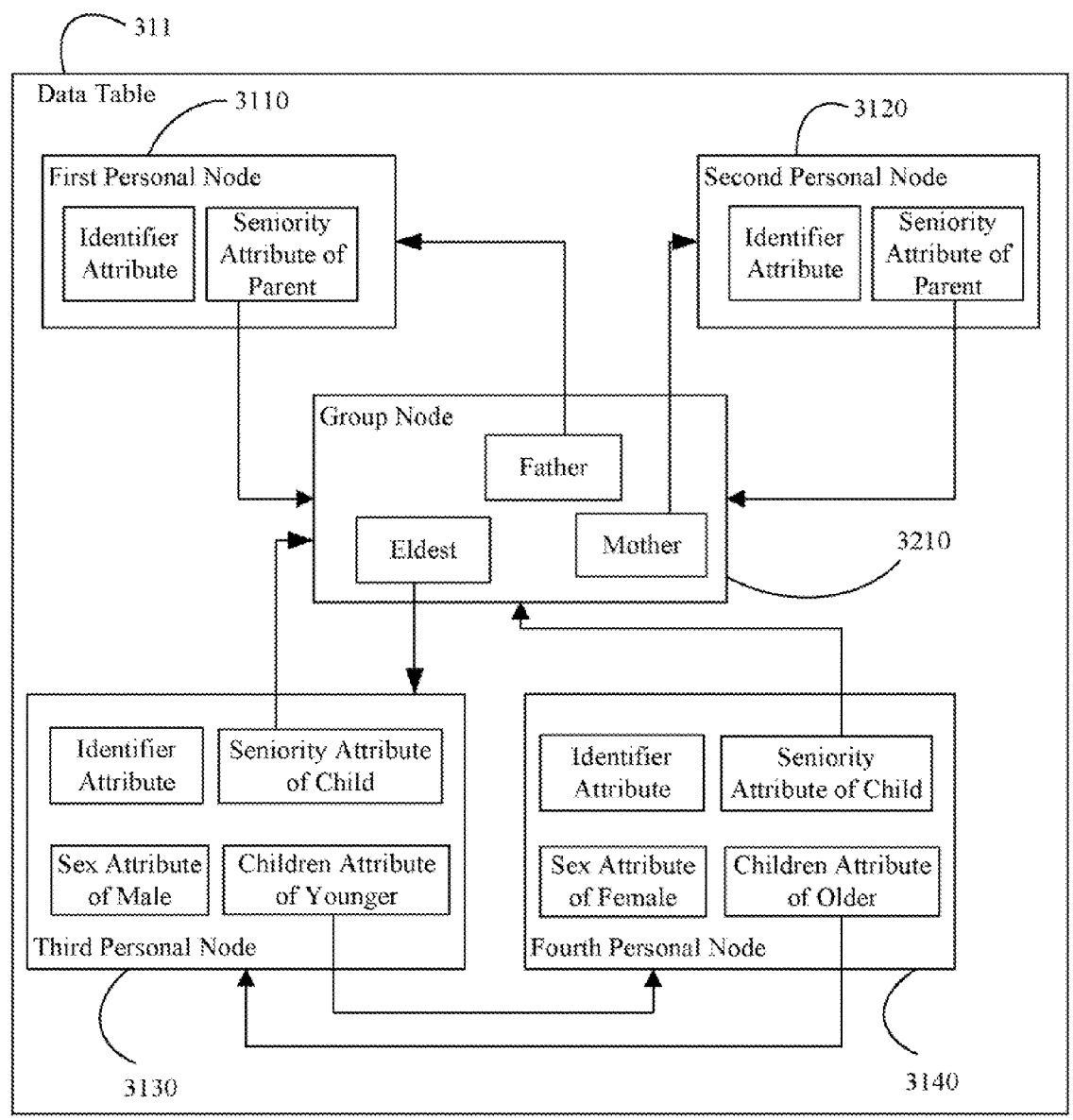
FIG. 4 is a detailed schematic diagram of one embodiment of the data table of FIG. 3.

FIG. 4 is a detailed schematic diagram of one embodiment of the data table 311 of FIG. 3. The data table 311 of FIG. 4 is created according to group members and relationships among the group members of FIG. 2. In one embodiment, the first personal node 3110, the second personal node 3120, the third personal node 3130, and the fourth personal node 3140 correspond to the first member 2110, the second member 2120, the third member 2130, and the fourth member 2140, respectively, through their identifier attributes.

In one embodiment, the first personal node 3110 and the second personal node 3120 both include identifier attributes and seniority attributes that are both configured as "parent". The third personal node 3130 includes an identifier attribute, a seniority attribute "child." a children attribute "younger," and a gender attribute "male." The fourth personal node 3140 includes an identifier attribute, a seniority attribute "child," a children attribute "older," and a gender attribute "female."

In one embodiment, the group node 3210 includes three status attributes that are configured as "father," "mother," and "eldest". The group node 3210 is connected to the first personal node 3110, the second personal node 3120, and the third personal node 3130 through its status attributes, "father," "mother," and "eldest" respectively.

In one embodiment, the first personal node 3110 and the second personal node 3120 are connected to the group node 3210 both through their seniority attributes "parent." The third personal node 3130 and the fourth personal node 3140 are connected to the group node 3210 both through their seniority attributes "children." The third personal node 3130 is connected to the fourth personal node 3140 through its children attribute "younger." The fourth personal node 3140 is connected to the third personal node 3130 through its children attribute "older."

It may be understood that the data table 311 is not be limited to the embodiment of FIG. 4. In another embodiment, a quantity of personal nodes, group nodes, and attributes thereof may be varied according to different groups. For example, the data table 311 may not include the fourth personal node 3140 when a family has only one child. The third personal node 3130 only includes the identifier attribute and the seniority attribute "child." In one example, if there are another two personal nodes corresponding to a grandfather and a grandmother, the data table 311 may further include another group node that is connected to the two personal nodes corresponding to the grandfather and the grandmother and the first personal node 3110. In such a case, the first personal node 3110 further includes a seniority attribute "child" connects the another group node.

Referring back to FIG. 1, the user interface 120 is configured for receiving a login information regarding a user of the communication device 10. In one embodiment, the login information includes a personal identifier of the user and can be acquired by inputting words, voice input, or pressing specific buttons on the communication device 10.

The salutation obtaining module 130 is configured for obtaining a salutation of the one or more group members according to the user. In one embodiment, the salutation of the one or more group members according to the user can be acquired through inputting words or through voice input from the user.

The information searching module 140 is configured for searching the data table 311 according to the login information and the salutation of a group member in the group so as to determine a personal node corresponding to the group member. The information searching module 140 may then acquire personal information about the group member according to a corresponding personal node of the group member.

In one embodiment, the information searching module 140 compares the login information with identifier attributes corresponding to all respective personal nodes of the data table 311 so as to determines a personal node corresponding to the user. Next, the information searching module 140 then locates a group node according to the salutation and a seniority attribute of the personal node corresponding to the user. Third, the information searching module 140 then searches the data table 311 according to the salutation and a status attribute of the group node so as to determine a personal node corresponding to the group member. At last, the information searching module 140 then acquires personal information about the group member via an identifier attribute of the personal node corresponding to the group member.

Figure 5:
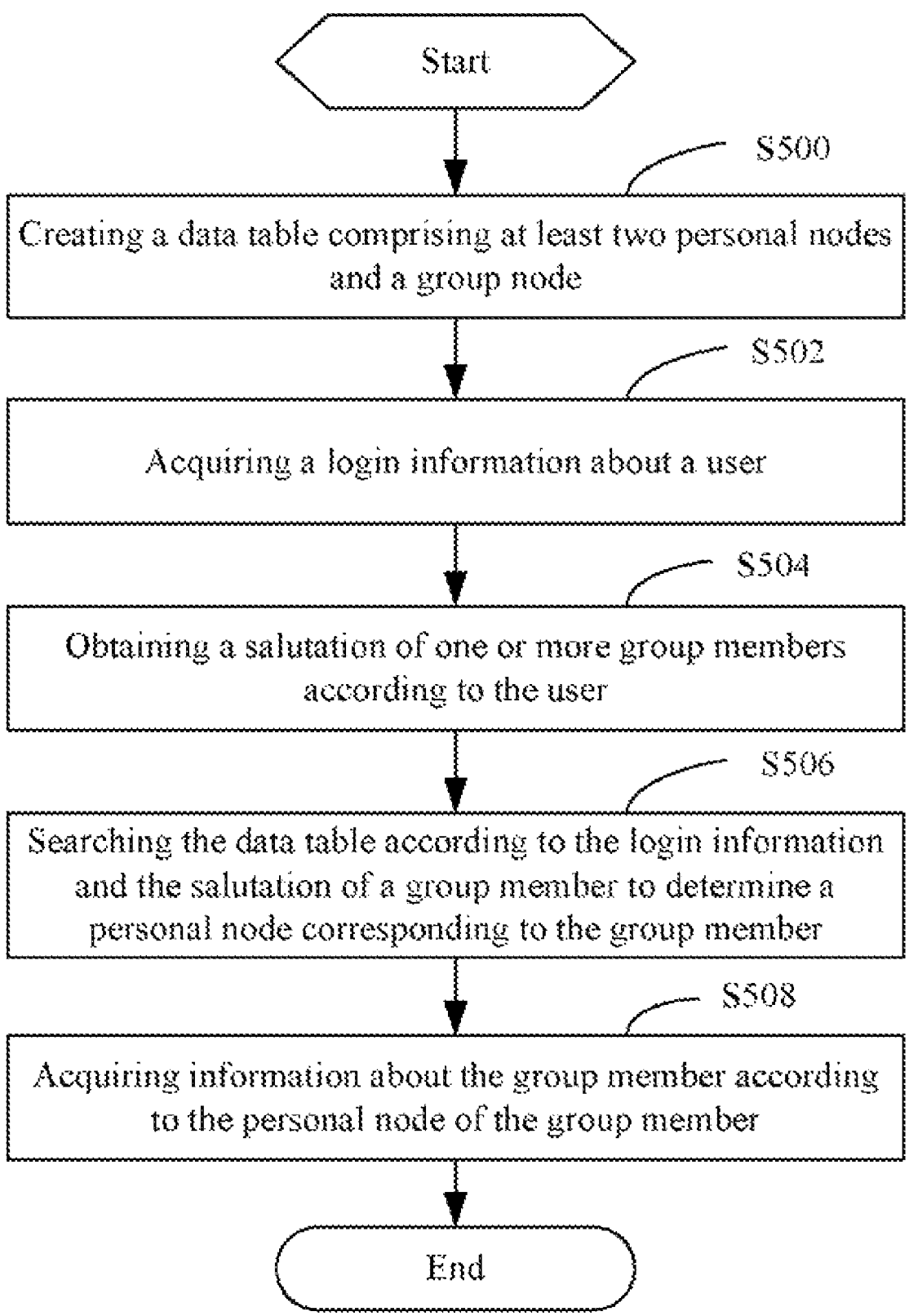
FIG. 5 is a flowchart of one embodiment of an information searching method in accordance with the present disclosure.

FIG. 5 is a flowchart of one embodiment of an information searching method in accordance with the present disclosure. In one embodiment, the information searching method is performed via the functional modules of FIG. 1 and FIG. 3. Depending on the embodiment, blocks may be arranged, blocks may be added, and others removed.

In block S500, the table creating module 110 creates the data table 311 according to relationships between a user and one or more group members in a group. In one embodiment, the data table 311 includes at least two personal nodes and one group node. Each personal node corresponds to a group member for storing information regarding the group member and relationships between the group members. The group node is connected to personal nodes of various group members in a group.

It may be understood that block S500 may not be performed whenever the information searching method has been executed. Block S500 may only be performed when the information searching method has been executed for a first time or when group members in a group or relationships among the group members have been changed.

In block S502, the user interface 120 acquires a login information about the user. In one embodiment, the login information includes a personal identifier of the user.

In block S504, the salutation obtaining module 130 obtains a salutation of one or more group members according to the user.

In block S506, the information searching module 140 searches the data table 311 according to the login information and the salutation of a group member in the group to determine a personal node corresponding to the group member.

In block S508, the information searching module 140 acquires personal information about the group member via the group member's personal node.

Figure 6:
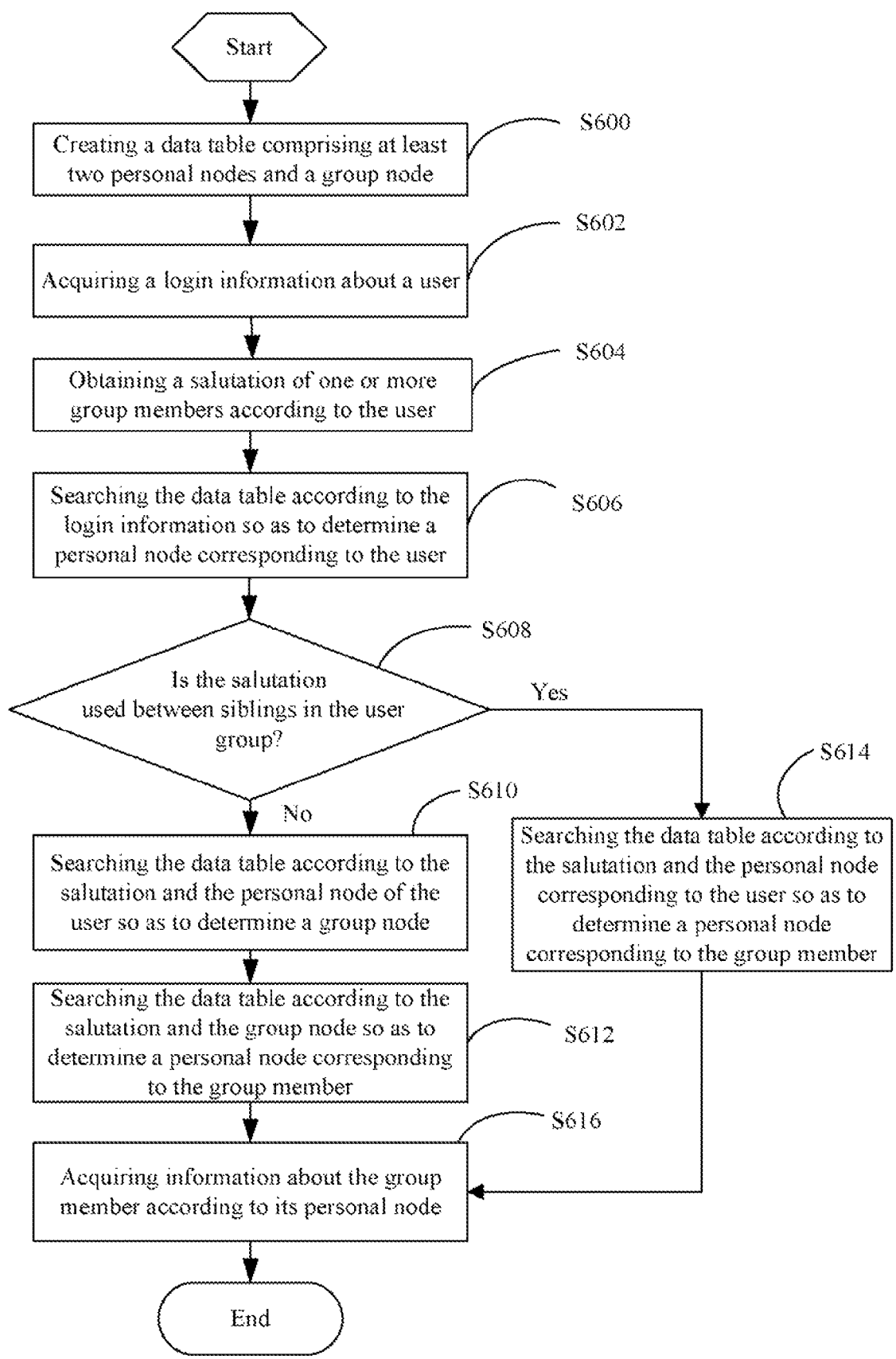
FIG. 6 is a detailed flowchart of one embodiment of the information searching method of FIG. 5.

FIG. 6 is a detailed flowchart of one embodiment of the information searching method of FIG. 5. In the embodiment of FIG. 6, a group may be a family. Depending on the embodiment, blocks may be arranged, blocks may be added, and others removed.

In block S600, the table creating module 110 creates the data table 311 according to relationships between a user and one or more group members in the group. In one embodiment, the data table 311 includes at least two personal nodes and one group node. Each personal node includes at least an identifier attribute and a seniority attribute. The group node includes a plurality of status attributes. Each personal node further includes at least a children attribute and a gender attribute.

In block S602, the user interface 120 acquires a login information regarding the user. In one embodiment, the login information may include a personal identifier of the user. The login information can be acquired by inputting words, voice input, or pressing specific buttons in the communication device 10.

In block S604, the salutation obtaining module 130 obtains a salutation of the one or more group members according to the user. In one embodiment, the salutation can be acquired by inputting words, voice input, or pressing specific buttons on the communication device 10.

In block S606, the information searching module 140 searches the data table 311 so as to determine a personal node corresponding to the user according to the login information. In one embodiment, the information searching module 140 compares a personal identifier of the login information with an identifier attribute of a personal node of the data table 311 in order to locate a personal node corresponding to the user.

In block S608, the information searching module 140 determines whether the salutation is used between siblings in the user's family. In one embodiment, the salutation which is used between siblings in the user's family may include "sister" or "brother."

If the salutation is not used between siblings in the user's family, then in block S610, the information searching module 140 searches the data table 311 to determine a group node according to the salutation of a group member in the group and the personal node corresponding to the user. In one embodiment, the information searching module 140 determines a group node according to the salutation and the seniority attribute of the personal node corresponding to the user. For example, if the user is a child of the group member, then the group node can be located through the seniority attribute "child" of the user's personal node.

In block S612, the information searching module 140 searches the data table 311 to determine a personal node corresponding to the group member according to the salutation and the group node. In one embodiment, the information searching module 140 determines a personal node corresponding to the group member according to the salutation and the status attribute of the group node. For example, if the group member is a parent of the user, then a personal node corresponding to the group member can be located via the status attribute "parent" of the group node.

If the salutation is used between siblings in the user's family, then in block S614, the information searching module 140 searches the data table 311 to determine a personal node corresponding to the group member according to the salutation and the personal node corresponding to the user. In one embodiment, the information searching module 140 determines a personal node corresponding to the group member according to the salutation, a children attribute of the user's personal node, and a gender attribute of the user's personal node. For example, if the user has only a younger sister who is the group member, then a personal node can be located via a children attribute "younger" of the user's personal node. Therefore, the personal node is corresponding to the group member if a gender attribute of the personal node is "female."

It may be understood that blocks S608 and S614 may not be performed if the family has only one child.

In block S616, the information searching module 140 acquires personal information about the group member according to the personal node corresponding to the group member. In one embodiment, the information searching module 140 gets the personal identifier of the group member according to the identifier attribute of the personal node corresponding to the group member. The information searching module 140 then acquires the personal information about the group member according to the personal identifier of the personal node of the group member.

In a further embodiment, if a family includes more than two generations, the family can be divided into several immediate families that only include one generation, namely, father, mother, and children thereof. For example, if there are five group members that are a grandfather, a grandmother, a father, a mother, and a son in a family, then the family is divided to a first immediate group and a second immediate group. The first group includes the grandfather, the grandmother, and the father. The second immediate group includes the father, the mother, and the son. Thus, the data table 311 may include five personal nodes of the five group members and two group nodes of the two immediate groups. A personal node corresponding to the father includes two seniority attributes "parent" and "child." The seniority attribute "parent" of the father's personal node is connected to a group node of the first immediate family. The seniority attribute "child" of the father's personal node is connected to the group node of the second immediate family.

In one embodiment, if the user and a group member whose information is required by the user are not in an immediate family, then the salutation which is used by the user for obtaining the group member's information in the group may be divided into several immediate salutations. The immediate salutation may be in an immediate family. In one embodiment, the immediate salutation may include "father," "mother," "elder sister," and "elder brother." For example, if the salutation is "grandfather," the salutation may be divided into two immediate salutations "father" and "father". In one embodiment, the information searching module 140 searches the data table 311 to determine a personal node corresponding to the group member through a personal node and a group node in a immediate group according to a immediate salutation in the immediate group one-by-one. For example, if the user is the son and the group member is the grandfather, the information searching module 140 determines the father's personal node via the second immediate group according to the son's personal node firstly. The information searching module 140 then determines the grandfather's personal node via the first immediate group according to the father's personal node.

The communication device 10 of the present disclosure may search information regarding a group member according to a salutation that is used by a user to obtain the information about the group member in the user's group and according to personal nodes and group nodes in the data table 311. Therefore, if a user wants to call or email one of his or her group members, the user only needs to use a salutation. The communication device 10 can automatically call or email the group member, which is more fast and convenient.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A communication device for obtaining information regarding a group comprising a user and one or more group members, the communication device comprising:
   a table creating module configured for creating a data table according relationships between the user and the one or more group members in the group, the data table comprising at least two personal nodes and a group node, each personal node corresponding to a group member of the group, the group node connecting to the at least two personal nodes, and each personal node of the at least two personal nodes comprising an identifier attribute and a seniority attribute, wherein the identifier attribute indicating a personal identifier of a group member corresponding to the personal node, and the seniority attribute connecting the personal node to the group node;
   a user interface configured for acquiring a login information about the user;
   a salutation obtaining module configured for obtaining a salutation of the one or more group members according to the user; and
   an information searching module configured for searching the data table according to the login information and the salutation of a group member in the group so as to determine a personal node corresponding to the group member, for acquiring information about the group member according to the personal node corresponding to the group member, for comparing the login information of the user with identifier attributes of all respective personal nodes of the data table so as to determine the personal node corresponding to the user, and further for determining the group node according to the salutation and the seniority attribute of the personal node corresponding to the user.

2. The communication device as claimed in claim 1, wherein the information searching module is further configured for searching the data table so as to determine a personal node corresponding to the user according to the login information.

3. The communication device as claimed in claim 2, wherein the information searching module is further configured for searching the data table so as to determine a group node according to the salutation and the personal node corresponding to the user.

4. The communication device as claimed in claim 3, wherein the information searching module is further used for searching the data table according to the salutation and the group node so as to determine the personal node corresponding to the group member.

5. The communication device as claimed in claim 1, wherein the group node comprises a plurality of status attributes and each status attribute connects the group node to the personal node.

6. The communication device as claimed in claim 5, wherein the information searching module is further configured for determining the personal node corresponding to the group member according to the salutation and the status attribute of the group node.

7. The communication device as claimed in claim 1, wherein each personal node further comprises a children attribute connecting the personal node to another personal node whose group member is a neighboring sibling of a group member corresponding to the personal node.

8. The communication device as claimed in claim 7, wherein each personal node further comprises a gender attribute configured as gender of a group member corresponding to the personal node.

9. The communication device as claimed in claim 8, wherein the information searching module is further used for determining the personal node corresponding to the group member according to the salutation, the children attribute of the user's personal node, and the gender attribute of the user's personal node if the salutation is used between siblings in the user's group.

10. An information searching method for obtaining information regarding a group comprising a user and one or more group members, the method comprising:

creating a data table according relationships between the user and the one or more group members, the data table comprising at least two personal nodes and a group node, each personal node of the at least two personal nodes corresponding to one group member of the group, the group node connecting to the at least two personal nodes, and each personal node of the at least two personal nodes comprising an identifier attribute and a seniority attribute, wherein the identifier attribute indicates a personal identifier of a group member corresponding to the personal node, and the seniority attribute connects the personal node to the group node;

acquiring a login information about the user;

obtaining a salutation of the one or more group members according to the user;

comparing the login information with the identifier attributes of all respective personal nodes of the data table so as to determine a personal node corresponding to the user;

searching the data table to determine a group node according to the salutation and a seniority attribute of the personal node corresponding to the user; and searching the data table to determine a personal node corresponding to the group member according to the salutation and a status attribute of the group node; and acquiring information about the group member according to the personal node corresponding to the group member.

11. The information searching method as claimed in claim 10, wherein the block of searching the data table according to the login information and the salutation comprises:

searching the data table to determine a personal node corresponding to the user according to the login information;

searching the data table to determine a group node according to the salutation and the personal node corresponding to the user; and searching the data table to determine a personal node corresponding to the group member according to the salutation and the group node.

12. The information searching method as claimed in claim 10, wherein each personal node further comprises a children attribute configured for connecting the personal node to another personal node whose group member is a neighboring sibling of a group member corresponding to the personal node.

13. The information searching method as claimed in claim 12, wherein each personal node further comprises a gender attribute configured as gender of a group member corresponding to the personal node.

14. The information searching method as claimed in claim 13, further comprising:

determining if the salutation is used between siblings of the user's group; and searching the data table to determine a personal node corresponding to the group member according to the salutation, the children attribute of the user's personal node, and the gender attribute of the user's personal node if the salutation is used between siblings of the user's group.

* * * * *